US008810446B2

(12) United States Patent
Shoji et al.

(10) Patent No.: US 8,810,446 B2
(45) Date of Patent: Aug. 19, 2014

(54) RADAR DEVICE, RADAR RECEIVER, AND TARGET DETECTION METHOD

(75) Inventors: Yoshikazu Shoji, Kawasaki (JP); Mitsuyoshi Shinonaga, Kawasaki (JP); Junichiro Suzuki, Hino (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 389 days.

(21) Appl. No.: 13/363,834

(22) Filed: Feb. 1, 2012

(65) Prior Publication Data

US 2012/0200451 A1  Aug. 9, 2012

(30) Foreign Application Priority Data

Feb. 3, 2011 (JP) ................................. 2011-021693

(51) Int. Cl.
 *G01S 13/58* (2006.01)
(52) U.S. Cl.
 USPC ............................ 342/107; 342/109; 342/146
(58) Field of Classification Search
 USPC ......................................... 342/107, 109, 146
 See application file for complete search history.

(56) References Cited

U.S. PATENT DOCUMENTS

2004/0178951 A1* 9/2004 Ponsford et al. .............. 342/192

FOREIGN PATENT DOCUMENTS

| JP | 7-43449 A | 2/1995 |
| JP | 9-297176 A | 11/1997 |
| JP | 10-206523 A | 8/1998 |
| JP | 11-133146 A | 5/1999 |
| JP | 2001-194451 A | 7/2001 |
| JP | 2005-165421 A | 6/2005 |
| JP | 2010-2410 A | 1/2010 |

OTHER PUBLICATIONS

Office Action issued on Jan. 8, 2013, in Japanese patent Application No. 2011-021693 with English translation.
Eran Fishier et al., "Spatial Diversity in Radars-Models and Detection Performance", IEEE Trans. on Signal Processing, vol. 54, No. 3, Mar. 2006, pp. 823-838.
Eran Fishier et al., "Performance of MIMO Radar Systems: Advantages of Angular Diversity", IEEE Trans. on Signal Processing, 2004, pp. 305-309.
Stefano Buzzi, et al., "Track-Before-Detect Procedures for Early Detection of Moving Target from Airborn Radars", IEEE Transactions on Aerospace and Electronic Systems, vol. 41, No. 3, Jul. 2005, pp. 937-954.

* cited by examiner

*Primary Examiner* — Timothy A Brainard
(74) *Attorney, Agent, or Firm* — Oblon, Spivak, McClelland, Maier & Neustadt, L.L.P.

(57) ABSTRACT

According to one embodiment, a radar device includes a radio module, a pulse compressor, a Doppler filter processor, a signal processor, an integration processor, an estimation module and a target detector. The radio module receives a plurality of received pulses corresponding to transmission pulses transmitted from a transmitter. The integration processor generates third data by integrating first data generated at the signal processor with second data generated based on first data obtained by a previous scan. The estimation module estimates a position at a time of a next scan based on the third data to generate second data. The target detector detects a target based on the third data.

18 Claims, 9 Drawing Sheets

| Item | Parameter | Note |
|---|---|---|
| Frequency | S-band | |
| Pulse number | 32 | |
| Processing range number | 3600 | Range sampling approximately 2 MHz |
| Minimum processing range | 30km | |
| Maximum processing range | 300km | |
| Beam position number | 27 | |
| Scan number | 60 | |
| Detection probability $P_D$ | 0.5 | |
| Error-alert probability $P_{FA}$ | $10^{-6}$ | |
| Required SNR | 12.8dB | SNR required under the conditions; $P_D=0.5$, $P_{FA}=10^{-6}$ |
| Maximum detection range | 130km | In one CPI detection processing |

F I G. 8

| Item | Parameter | Note |
|---|---|---|
| Target number | 1 | |
| Movement model | Uniform linear motion | |
| RCS | $0.01m^2$ | |
| Velocity | 0.9mach | 1mach≒340m/s |
| Movement start position | x,y = (230km,0) | Radar corresponds to origin(0,0) |
| Movement end position | x,y = (30km,0) | |

RADAR DEVICE, RADAR RECEIVER, AND TARGET DETECTION METHOD

CROSS-REFERENCE TO RELATED APPLICATIONS

This application is based upon and claims the benefit of priority from prior Japanese Patent Application No. 2011-021693, filed Feb. 3, 2011, the entire contents of which are incorporated herein by reference.

FIELD

Embodiments described herein relate generally to a radar device, a radar receiver, and a target detection method.

BACKGROUND

In conventional radar devices, a radar transmitter directs a beam in a direction, and transmits a plurality of transmission pulses at predetermined pulse repetition interval (PRI). A radar receiver performs coherent integration on a plurality of reflected pulses, which have been reflected, scattered, or diffracted by an object. The coherent integration is an operation of coherently integrating reflected pulses in the same range. Generally, a discrete Fourier transform (DFT) is used in coherent integration. The coherent integration process using the DFT may be generically called a Doppler filtering process. Generally, a period in which a radar transmitter transmits a plurality of transmission pulses in one beam position and a radar receiver performs coherent integration on reflected pulses based on the transmission pulses from the radar transmitter is called a coherent processing interval (CPI). The radar receiver measures the strength of a received signal coherently integrated for each CPI, and detects the received signal as a target signal when the measured value exceeds a threshold.

When the radar cross section (RCS) of the target is small, the power of the reflected pulses received at the radar receiver is small. Therefore, a target of small RCS has been very difficult to be detected even if reflected pulses are coherently integrated for each CPI.

DETAILED DESCRIPTION

In general, according to one embodiment, a radar device includes a transmitter, a radio module, a pulse compressor, a Doppler filter processor, a signal processor, an integration processor, an estimation module and a target detector. The transmitter transmits a plurality of transmission pulses per direction to a search area. The radio module receives per direction a plurality of received pulses corresponding to the transmission pulses. The pulse compressor performs pulse compression on the received pulses to generate a range bin data item for each of the received pulses. The Doppler filter processor performs coherent integration on a plurality of range bin data items generated for each direction to generate a range bin data item for each frequency bin. The signal processor generates first data indicating a state of the search area using a range, an azimuth angle, an elevation angle, and a relative velocity calculated based on the frequency bin, based on the range bin data item for each frequency bin obtained by one scan to the search area. The integration processor generates third data by integrating the first data generated at the signal processor with second data generated based on first data obtained by a previous scan to the search area. The estimation module estimates a position at a time of a next scan based on a relative velocity indicated by the third data and shifts the third data to the estimated position to generate second data. The target detector detects a target based on the third data.

[First Embodiment]

Figure 1:
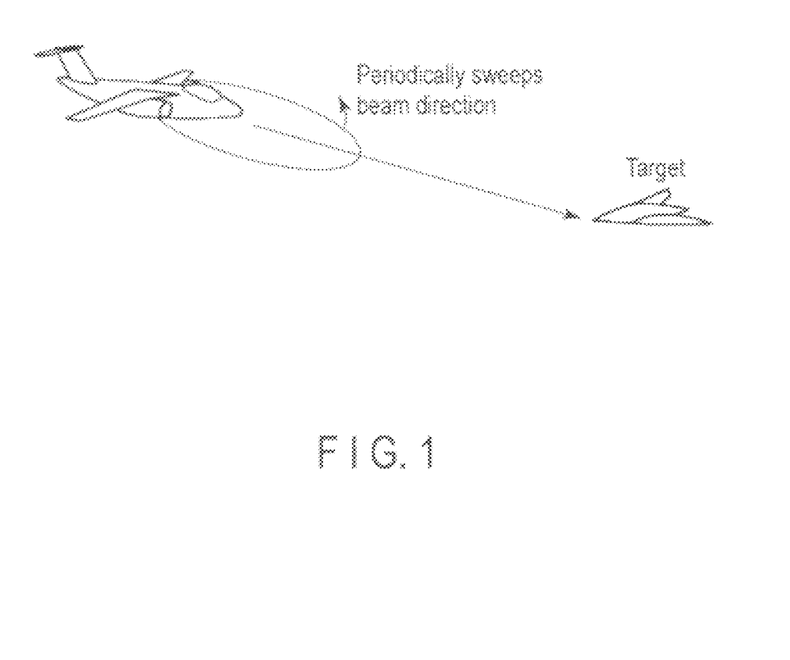
FIG. 1 shows how a mobile unit comprising a radar device according to a first embodiment searches for a target.

FIG. 1 is a schematic diagram showing how a mobile unit including a radar device according to a first embodiment searches for a target. The radar device included in the mobile unit shown in FIG. 1 searches a search area while periodically changing a beam direction to detect a target. Described herein is a case where the search area expands in all the directions from the radar device. However, the search area is not limited to the one expanding in all the directions from the radar device.

Figure 2:
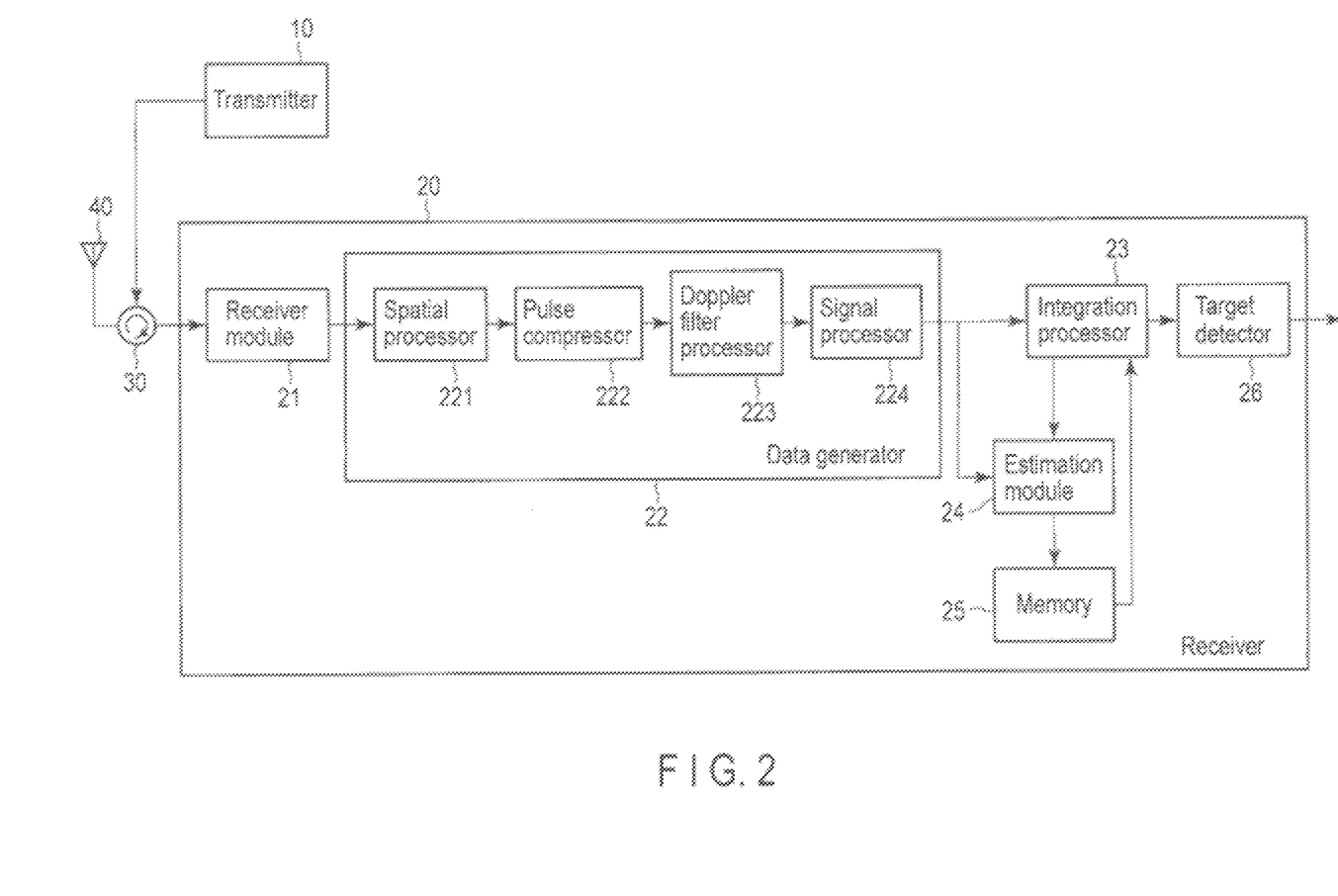
FIG. 2 is a block diagram showing a functional configuration of the radar device according to the first embodiment.

FIG. 2 is a block diagram showing a functional configuration of the radar device according to the first embodiment. The radar device shown in FIG. 2 includes a transmitter 10, a receiver 20, and a transmitter-receiver switch 30, and an antenna unit 40.

The transmitter 10 includes, for example, a signal generator, a digital-to-analog converter, a frequency converter, a filter and an amplifier. The transmitter 10 generates a transmission pulse, and transmits the generated transmission pulse from the antenna unit 40 to space via the transmitter-receiver switch 30.

Figure 3:
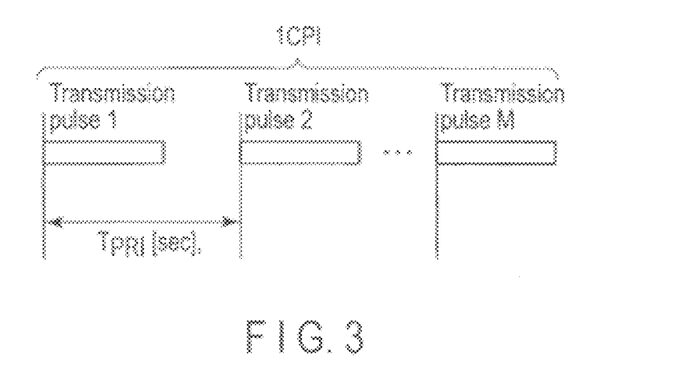
FIG. 3 shows transmission pulses transmitted from an antenna unit of the radar device shown in FIG. 2.

FIG. 3 is a schematic diagram of transmission pulses transmitted from the antenna unit 40 of the present embodiment. The transmitter 10 transmits a plurality of transmission pulses at predetermined coherent processing interval (CPI) per beam position. The transmission pulses are transmitted at certain pulse repetition interval (PRI). The CPI is set to fall within a time period during which a target does not move between range cells in a range direction, and changes in the azimuth angle and elevation angle of the target are negligible. M represents the number of pulses transmitted during one CPI. The transmitter 10 directs the transmission beam in a different direction for each CPI, and transmits transmission pulses from the antenna unit 40.

A transmission pulse transmitted from the antenna unit 40 is reflected, scattered and diffracted by, for example, a target, and reaches the radar device as a reflected pulse.

The receiver 20 receives a reflected pulse via the antenna unit 40 and the transmitter-receiver switch 30. As shown in FIG. 2, the receiver 20 includes a receiver module 21, a data generator 22, an integration processor 23, an estimation module 24, a memory 25, and a target detector 26.

The receiver module 21 includes, for example, a frequency converter and an analog-to-digital converter. The receiver module 21 receives a reflected pulse, and converts the received pulse into a digital received pulse in a base band. The receiver module 21 outputs the digital received pulse to the data generator 22.

The data generator 22 includes a spatial processor 221, a pulse compressor 222, a Doppler filter processor 223 and a signal processor 224.

The spatial processor 221 applies a predetermined beam weight on a received pulse supplied from the receiver module 21 to form a reception beam. The spatial processor 221 adjusts the beam weight superimposed on a received pulse so that the direction of the reception beam corresponds to the direction of the transmission beam, which varies every CPI. The spatial processor 221 outputs the received pulse on which the beam weight has been applied to the pulse compressor 222.

Figure 4:
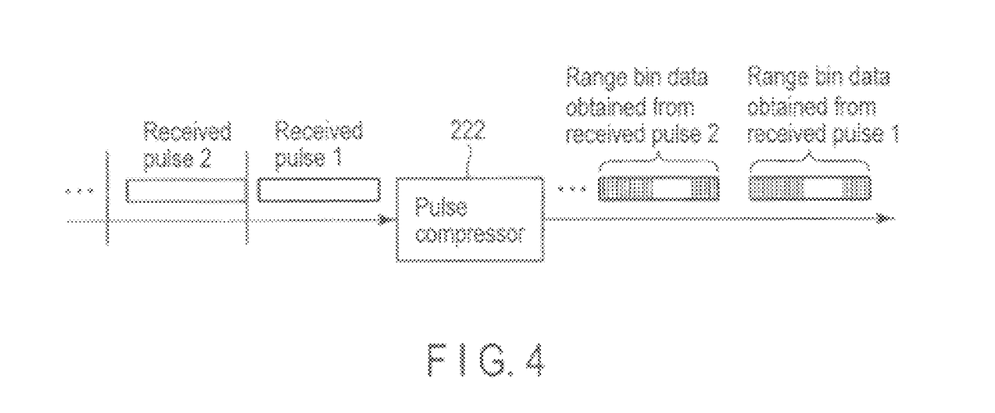
FIG. 4 shows pulse compression processing performed by a pulse compressor shown in FIG. 2.

The pulse compressor 222 performs pulse compression processing on the received pulse supplied from the spatial processor 221 to generate range data for each received pulse. The pulse compressor 222 outputs the generated range data to the Doppler filter processor 223. FIG. 4 is a schematic diagram of pulse compression processing performed by the pulse compressor 222.

Figure 5:
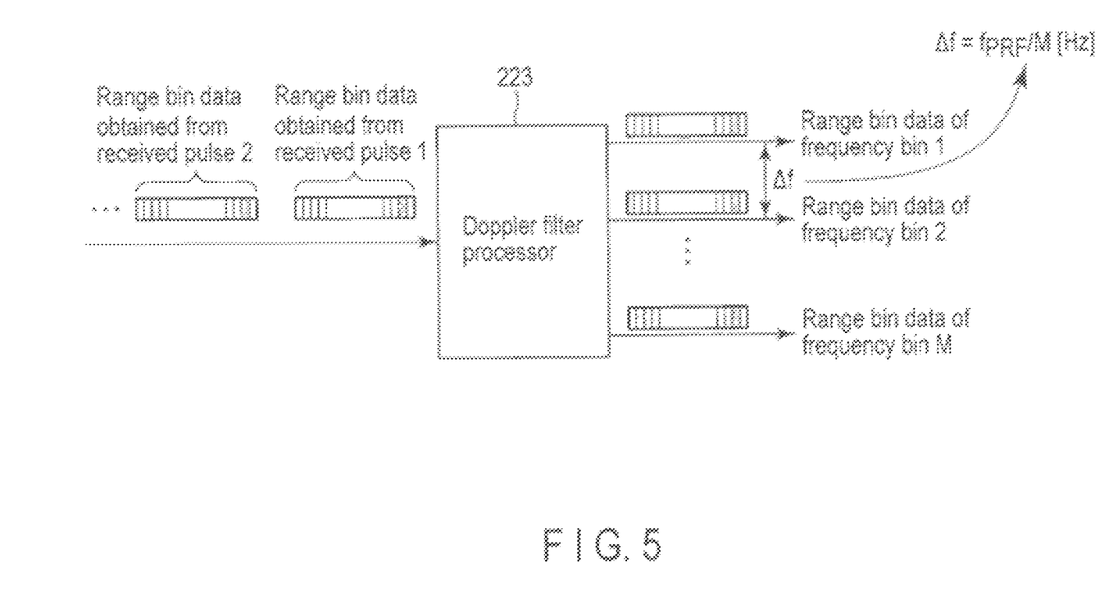
FIG. 5 shows coherent integration performed by a Doppler filter processor shown in FIG. 2.

The Doppler filter processor 223 performs coherent integration on the range data supplied from the pulse compressor 222 during one CPI. Namely, the Doppler filter processor 223 performs a discrete Fourier transform (DFT) on the same range components in the received pulses received during one CPI, i.e., M range bin data items, thereby generating range data for each of M frequency bins. The frequency bin is each of frequency band divisions having a predetermined bandwidth. The Doppler filter processor 223 outputs the generated range data to the signal processor 224. FIG. 5 is a schematic diagram of coherent integration performed by the Doppler filter processor 223.

Figure 6:
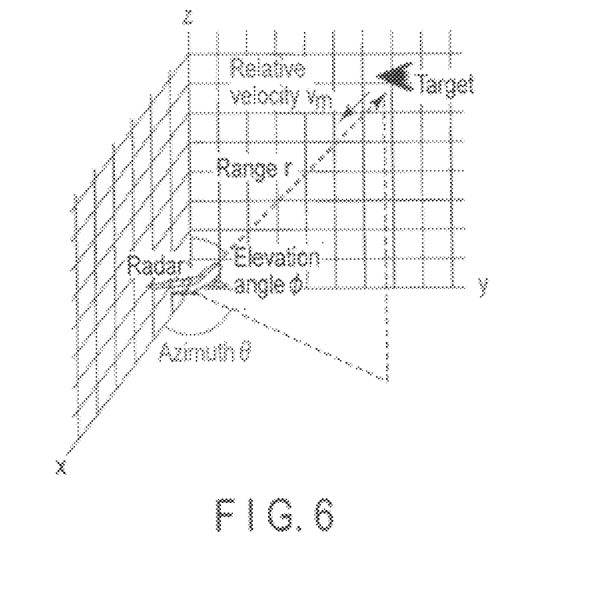
FIG. 6 shows the relationship between range r, azimuth θ, elevation angle φ, and relative velocity $v_m$, which are parameters of first data converted at a signal processor shown in FIG. 2.

Based on the range data supplied from the Doppler filter processor 223, the signal processor 224 makes the status of a search area expressed by range r, azimuth θ, elevation angle φ, and relative velocity $v_m$. Namely, the signal processor 224 generates first data so that the amplitude values of all range data obtained by one omnidirectional scan can be identified by range r, azimuth θ, elevation angle φ, and relative velocity $v_m$. First data obtained by scan i is expressed by $R^{(i)}$ (r, θ, φ, $v_m$). The signal processor 224 outputs the generated first data to the integration processor 23. FIG. 6 is a schematic diagram showing the relationship between range r, direction θ, elevation angle φ, and relative velocity $v_m$. Described herein is a case where an amplitude value of range data is identified by range r, direction θ, elevation angle φ, and relative velocity $v_m$. However, a power value of range data may be identified by range r, azimuth θ, elevation angle φ, and relative velocity $v_m$.

The relative velocity $v_m$ of a target in the $m^{th}$ frequency bin (where m is a natural number from 1 to M) is obtained as described below. The bandwidth Δf of each frequency bin shown in FIG. 5 is expressed as Δf=$f_{PRF}$/M. $f_{PRF}$ is 1/$T_{PRI}$, where $T_{PRI}$ represents a pulse repetition interval. Assuming that the value of each frequency bin varies only depending on change in the Doppler frequency caused by movement of the target, the relative velocity $v_m$(m) in the $m^{th}$ frequency bin is expressed by $v_m$(m)=m·Δf·c/fc, where c represents the light speed, and fc represents a carrier frequency.

When the estimation module 24 receives third data (to be described later) from the integration processor 23, the estimation module 24 assumes that a target is present in all the elements of third data. The estimation module 24 estimates a range bin in which the target would be present when a next scan is performed. The range bin is each of search area divisions having a predetermined range. The processing at the estimation module 24 will be described below.

As shown in FIG. 1, the radar device of the present embodiment sequentially emits/receives a transmission/reception beam in all the directions to search for a target. Namely, a beam is transmitted discretely (at scan intervals) in the same direction. When a scan is performed every $T_{scan}$ seconds, range data of each frequency bin 1 to M shown in FIG. 5 is obtained every $T_{scan}$ seconds.

When it is assumed that a target moves in uniform linear motion, a target present in frequency bin m is estimated to be at a distance of $v_m$(m)·$T_{scan}$ at the time of the next scan which is performed $T_{scan}$ seconds later.

Figure 7:
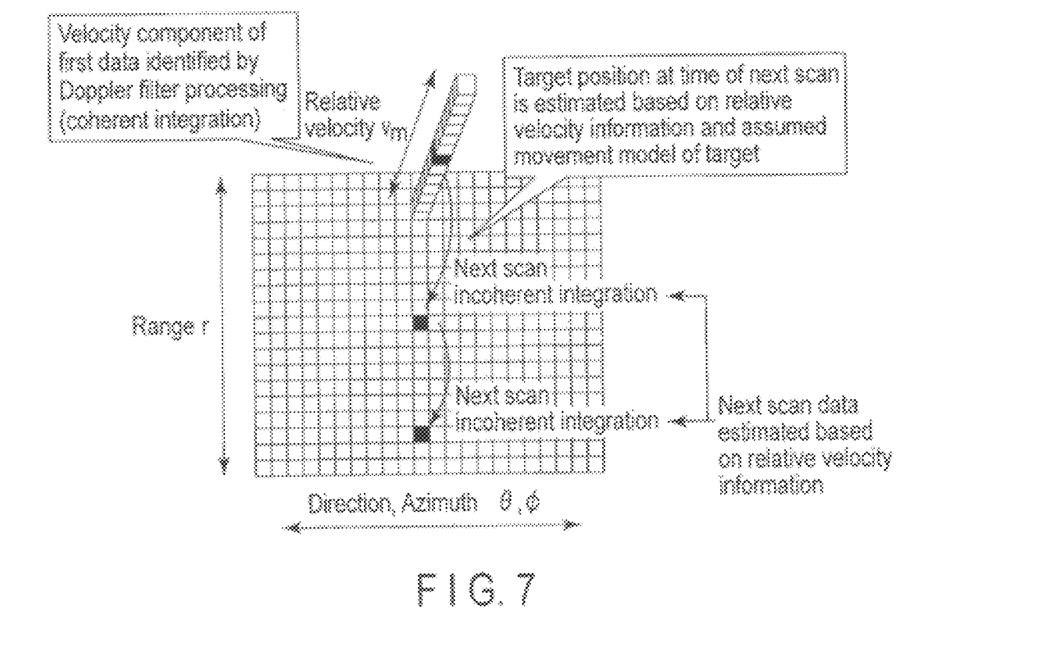
FIG. 7 shows how an estimation module shown in FIG. 2 estimates a present position of a target.

Namely, when the interval between adjacent range bins is x, the target moves by range bins, the number of which is given by $$\Delta n(m) = \lfloor v_m(m) \cdot T_{SCAN}/x \rfloor, \quad (1)$$

where $\lfloor y \rfloor$ is the maximum integer not more than y. If a target is present in range bin r, frequency bin m at the time of the $i^{th}$ scan, the target is estimated to be present in range bin r+Δn (m) and frequency bin m at the time of the $(i+1)^{th}$ scan, which is performed $T_{scan}$ seconds later. FIG. 7 is a schematic diagram showing processing performed when the estimation module 24 estimates a range bin in which a target would be present.

The estimation module 24 shifts third data to the estimated range bin to generate second data. The estimation module 24 causes the memory 25 to store the generated second data.

Upon receipt of first data from the signal processor 224, the integration processor 23 reads second data generated based on the previous scan from the memory 25. The integration processor 23 performs incoherent integration for combining the amplitude value of the first data supplied from the signal processor 224 with the amplitude value of the second data read from the memory 25 to generate third data. Third data $R_{int}$ corresponding to range bin $r_1$, relative velocity $V_{ml}$ can be calculated based on first data R supplied from the signal processor 224 and second data $R_{pre}$ read from the memory 25 as follows:

$$R_{int}^{(i)}(r_1, \theta, \phi, v_{ml}) = |R^{(i)}(r_1, \theta, \phi, v_{ml})|^2 + |R_{pre}^{(i-1)}(r_2 + \Delta n, \theta, \phi, v_{ml})|^2 \quad (2)$$

where $r_1$ is $r_2$+Δn. The integration processor 23 outputs the generated third data to the target detector 26 and the estimation module 24.

In the case of first scan, the integration processor 23 may output the first data supplied from the signal processor 224 to the target detector 26 and the estimation module 24 as third data. Further, in the case of first scan, the signal processor 224 may output first data to the estimation module 24. In this case, the estimation module 24 generates second data based on the first data output from the signal processor 224, and causes the memory 25 to store the generated second data.

The target detector 26 receives third data from the integration processor 23, and determines whether the amplitude value of the received third data exceeds a threshold value. The threshold value varies depending on the incoherent integration operation number. If the amplitude value of third data exceeds the threshold, the target detector 26 determines that a target has been detected.

Figure 8:
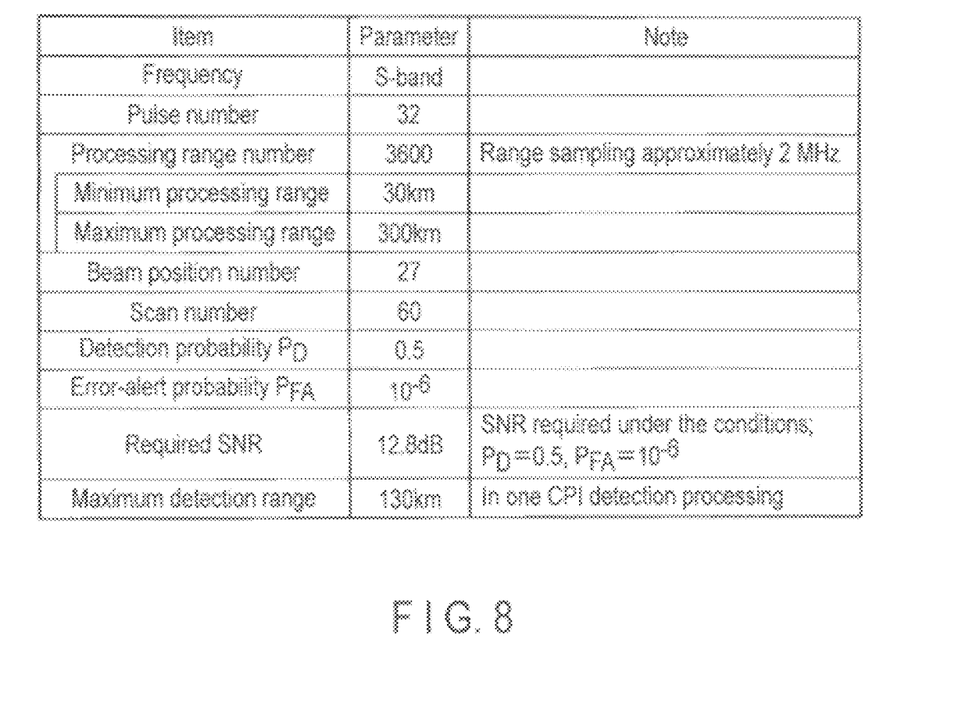
FIG. 8 shows parameters used in a simulation for the radar device shown in FIG. 2.
Figure 9:
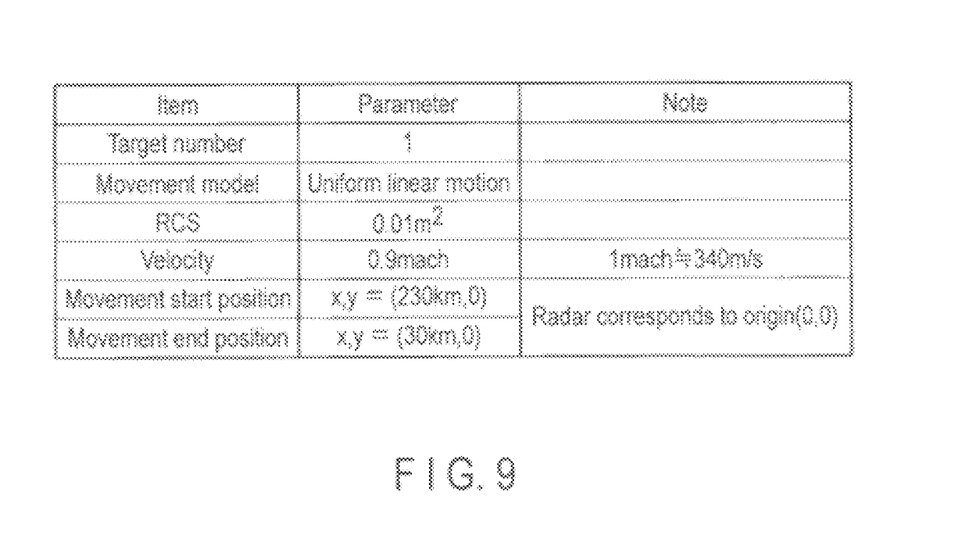
FIG. 9 shows parameters of a target used in the simulation for the radar device shown in FIG. 2.
Figure 10:
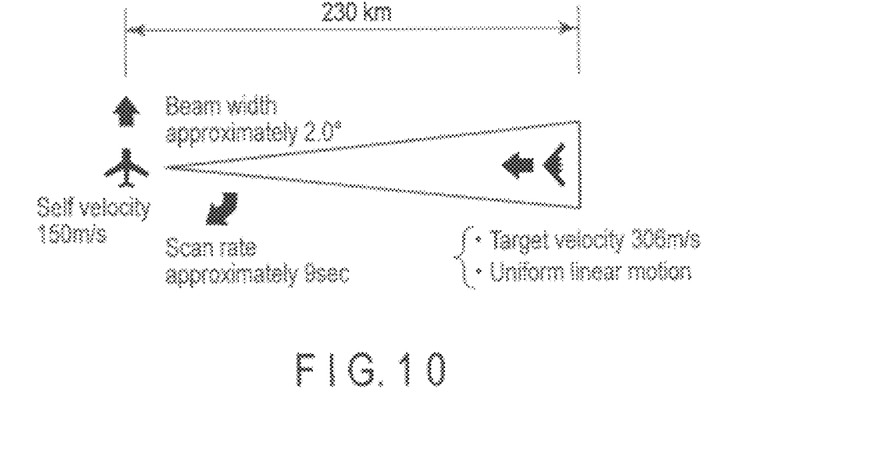
FIG. 10 shows the positional relationship between the radar device and the target in the simulation for the radar device shown in FIG. 2.

Next, a simulation result of performance evaluation of the radar device configured as described above will be described. FIG. 8 shows parameters of the radar device used in the simulation. FIG. 9 shows parameters of a target used in the simulation. FIG. 10 shows the positional relationship between the radar device and the target in the simulation. If detection is performed using a conventional one-CPI method, the radar device evaluated in the simulation can detect a target at a distance of 130 km with PD (detection probability)=0.5, PFA (false-alarm probability)=$10^{-6}$.

Figure 11:
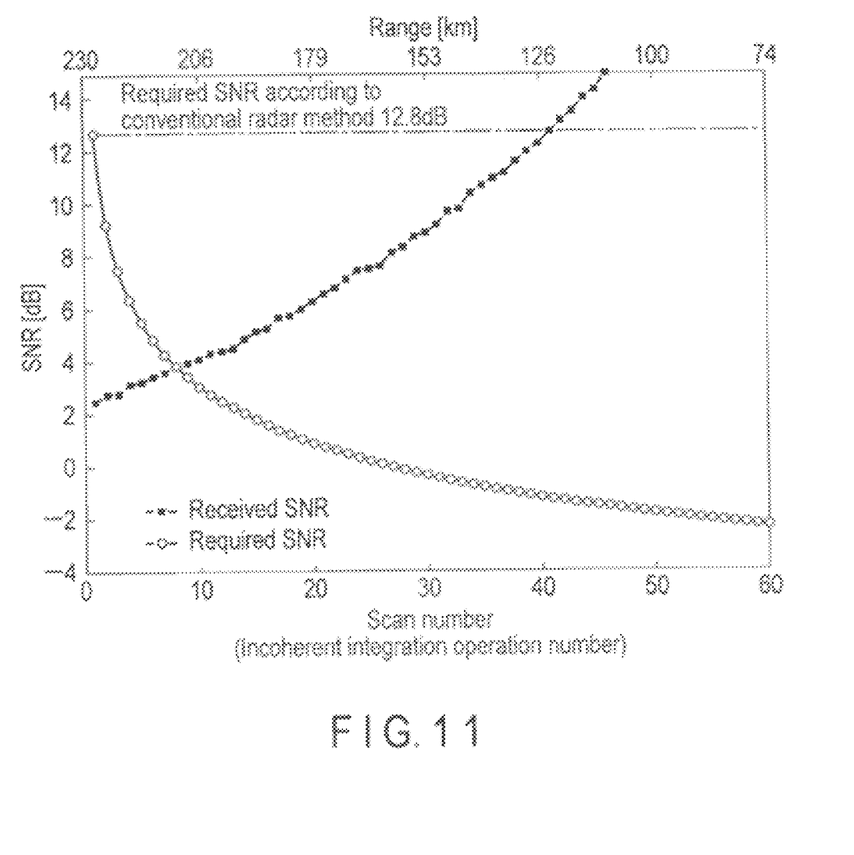
FIG. 11 shows required SNR transition and received SNR transition corresponding to the scan numbers according to the simulation shown FIG. 10.

FIG. 11 shows required SNR transition (theoretical values) required for target detection and received SNR transition actually received at the radar device in relation to the scan numbers (numbers of coherent integration operations at the integration processor 23) in the case of PD=0.5, PFA $10^{-6}$.

As shown in the graph, the required SNR decreases as the incoherent integration operation number corresponding to the scan number increases. The received SNR increases as the scan number increases since a target comes closer to the radar device. The point where the line of required SNR transition and the line of received SNR transition crosses indicates the number of a scan where a target can be detected.

The required SNR for target detection performed based on the conventional one-CPI method is approximately 12.8 dB, which does not change even if the scan number increases. Since a point where a line of required SNR transition and a line of received SNR transition crosses corresponds to the number of a scan where a target can be detected, a radar device adopting the conventional method can detect a target by approximately the 42nd or 43rd scan. The 42nd scan corresponds to a distance of approximately 125 km between the radar device and the target. In the radar device according to the present embodiment, as the scan number increases, the required SNR decreases, and the point where the line of required SNR transition and the line of received SNR transition crosses between the 8th and 9th scans corresponding to a distance of approximately 210 km between the radar device and the target.

Figure 12:
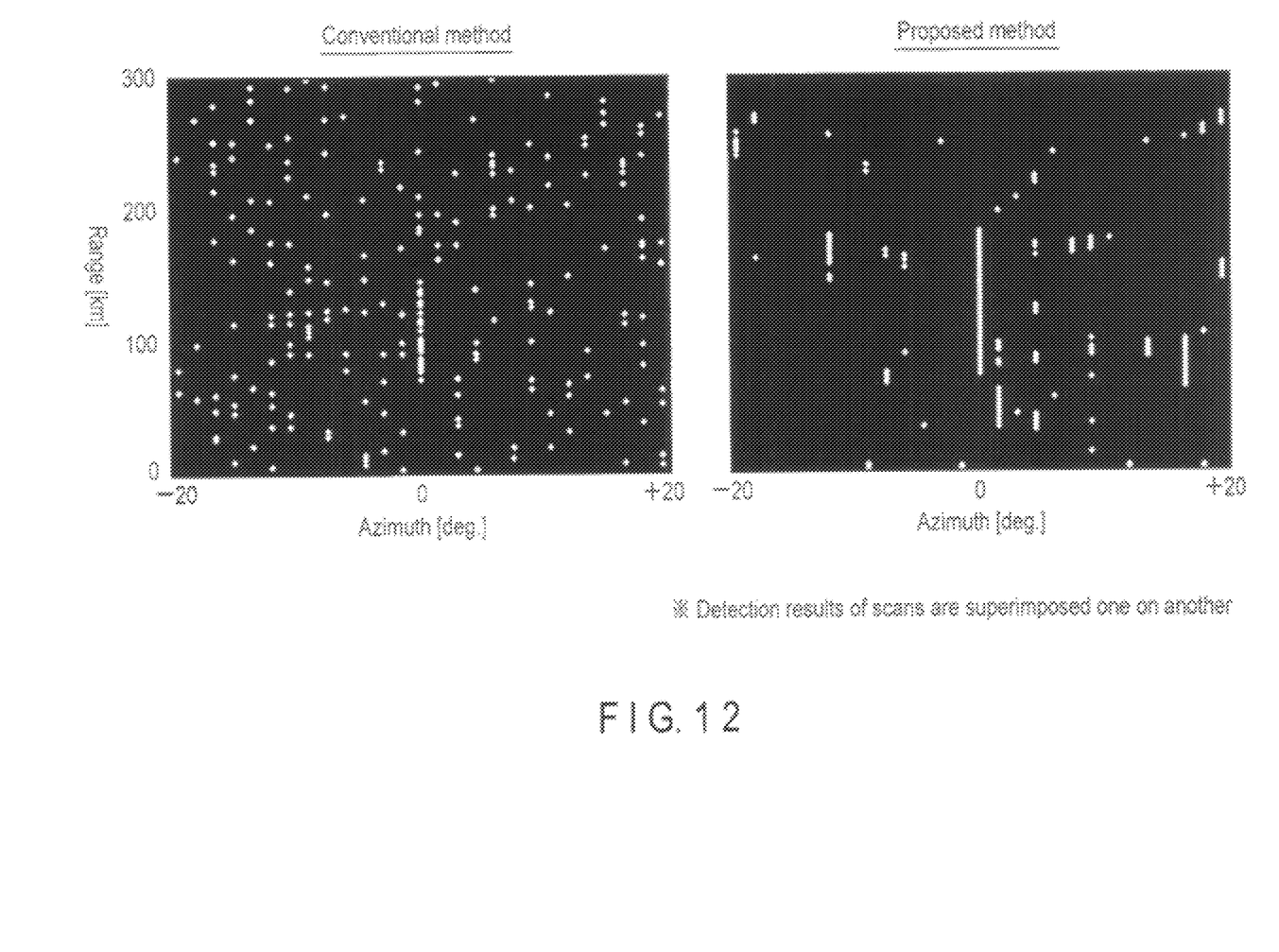
FIG. 12 shows a PPI display of a processing result according to a conventional method and a PPI display of a processing result according to the method of the first embodiment.

FIG. 12 shows a PPI display (B scope) according to a processing result of a radar device using a convention method and that of the radar device using the method proposed herein. According to the results, the radar device using the conventional method detects a target at a distance of approximately 130 km, whereas the radar device of the present embodiment can detect a target at a distance of approximately 200 km. From the results of FIG. 12, it is understood that the radar device of the present embodiment can detect a target at a greater distance than conventional radar devices.

As described above, in the first embodiment, the signal processor 224 generates first data indicating the amplitude value of range data using parameters r, θ, φ and $v_m$. The estimation module 24 estimates a range bin where the target would be present at the time of the next scan on the basis of the relative velocity, which is a parameter of third data, to generate second data. The integration processor 23 integrates the first data obtained by the current scan with the second data generated at the estimation module 24 based on the previous scan to generate third data. With this configuration, the amplitude value of the range bin where a target is actually present can be increased with scans fewer than scans conventionally required, and the target detection probability can be increased.

The radar device according to the first embodiment assumes the position where a target would be present and the velocity at which the target would move, and converts a polar coordinate signal into first data based on the assumed position and velocity.

Therefore, the radar device according to the first embodiment can detect a target even when the RCS of a target is small.

[Second Embodiment]

Figure 13:
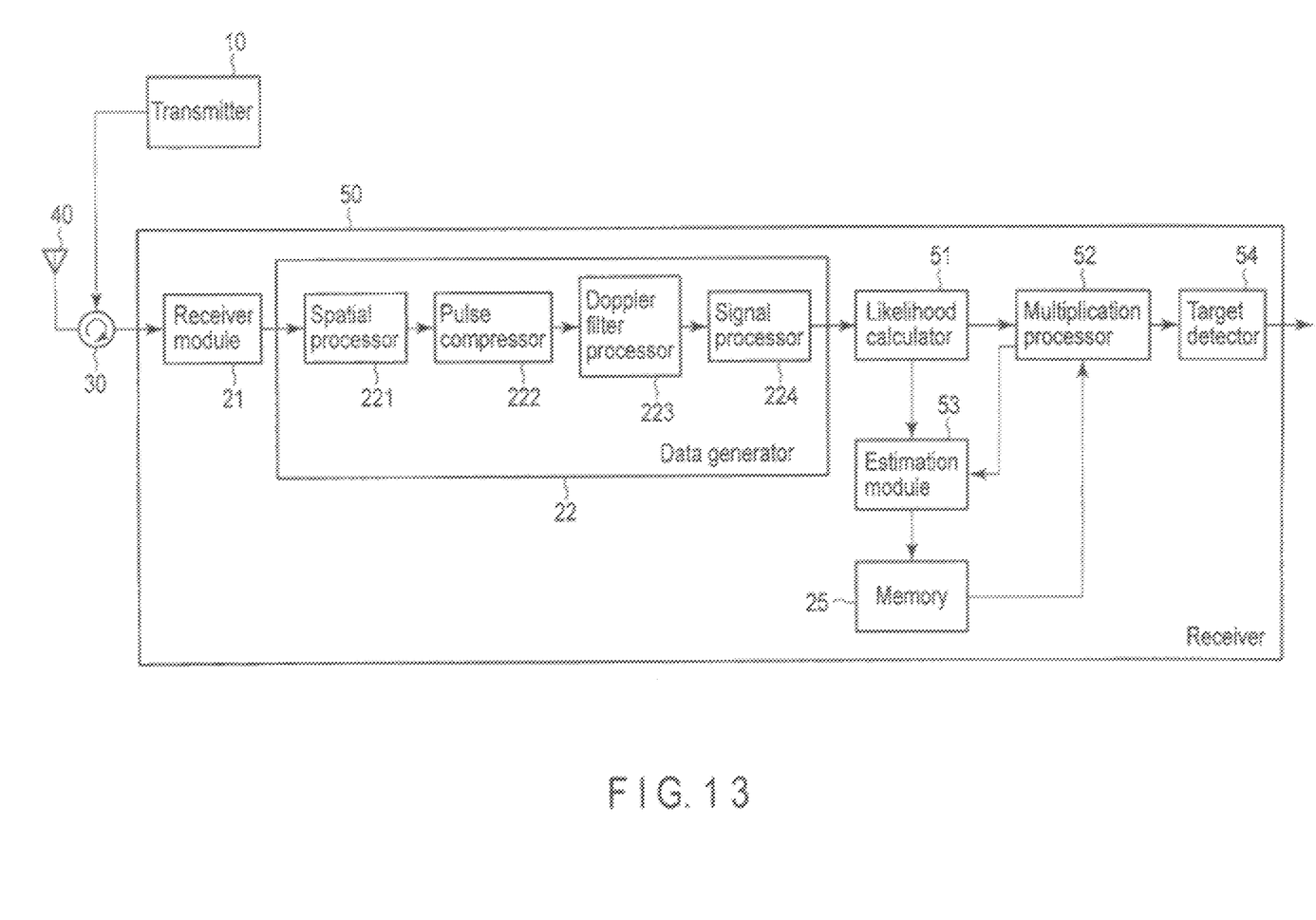
FIG. 13 is a block diagram showing a functional configuration of a radar device according to a second embodiment.

FIG. 13 is a block diagram showing a functional configuration of a radar device according to a second embodiment. The radar device shown in FIG. 13 includes a transmitter 10, a receiver 50, a transmitter-receiver switch 30, and an antenna unit 40. The same elements as those of the radar device according to the first embodiment will be assigned the same reference symbols.

The receiver 50 includes a receiver module 21, a data generator 22, a likelihood calculator 51, a multiplication processor 52, an estimation module 53, a memory 25, and a target detector 54.

The likelihood calculator 51 compares the distribution of amplitude values identified by first data supplied from the data generator 22 with a probability density distribution of receiver noise stored in advance so as to calculate, as likelihood information, a probability that the received pulse referred to when the first data is generated is a noise signal of the receiver.

The likelihood calculator 51 generates fourth data obtained by converting the amplitude value indicated by first data into the calculated likelihood information. The likelihood calculator 51 performs, for example, the following processing to calculate the likelihood information.

For example, let us assume that receiver noise is gaussian noise. When the noise signal assumed to be gaussian noise passes through a narrowband amplifier, the probability density function of the envelope of the voltage output follows Rayleigh distribution is given by $$P_N(A)dA = \frac{A}{\sigma_N}\exp\left(-\frac{A^2}{2\sigma_N}\right)dA, \tag{3}$$

where A is an amplitude of the output envelope of the narrowband amplifier, and $\sigma_N$ is a noise voltage. Where $A_i$ is an amplitude value of four-dimensional data $R^{(i)}$ (r, θ, φ, $v_m$), the probability (likelihood) that the received pulse is a noise signal can be derived from the following equation:

$$Pr(A_i) = 1 - \int_0^{A_i} \frac{A_i}{\sigma_N}\exp\left(-\frac{A_i^2}{2\sigma_N}\right)dA_i. \tag{4}$$

The likelihood calculated based on equation 4 indicates a probability that the amplitude value indicated by each bin of first data is derived from a noise signal. If the amplitude value $A_i$ indicated by first data takes a small value, the amplitude value $A_i$ follows the Rayleigh distribution. Thus, the probability that the received pulse referred to when the amplitude value indicated by this bin was calculated is a noise signal is high. If the amplitude value $A_i$ indicated by first data takes a large value, the probability that the received pulse referred to when the amplitude value indicated by this bin was calculated is a noise signal is low, and the probability that the obtained amplitude value is derived from a target is high. The likelihood calculator 51 outputs the generated fourth data to the multiplication processor 52.

Upon receipt of sixth data (to be described later) from the multiplication processor 52, the estimation module 53 assumes that a target is present in all the elements of the sixth data. The estimation module 53 estimates a range bin where the target would be present at the time of the next scan on the basis of the relative velocity, which is a parameter of the sixth data. Namely, when a target is present in range bin r, frequency bin m at the time of the $i^{th}$ scan, the estimation module 53 estimates the target to be present in range bin r+Δn, frequency bin m at the time of the $(i+1)^{th}$ scan, which is performed $T_{scan}$ later. The estimation module shifts the sixth data to the estimated range bin, and generates fifth data. The estimation module 53 causes the memory 25 to store the generated fifth data.

Upon receipt of fourth data from the likelihood calculator 51, the multiplication processor 52 reads the fifth data generated based on the previous scan from the memory 25. The multiplication processor 52 multiplies the likelihood information of the fourth data supplied from the likelihood calculator 51 by the likelihood information of the fifth data read from the memory 25 to generate sixth data. Sixth data $Pr_{comb}$ is calculated based on fourth data Pr supplied from the likelihood calculator 51 and fifth data $Pr_{pre}$ read from the memory 25 as follows:

$$Pr_{comb}=Pr(A_i) \times Pr_{pre}(A_{i-1}), \quad (5)$$

The multiplication processor 52 outputs the generated sixth data to the estimation module 53 and the target detector 54.

In the case of first scan, the multiplication processor 52 may output the fourth data supplied from the likelihood calculator 51 to the target detector 54 and the estimation module 53 as sixth data. Further, in the case of first scan, the likelihood calculator 51 may output the fourth data to the estimation module 53. In this case, the estimation module 53 generates fifth data based on the fourth data output from the likelihood calculator 51, and causes the memory 25 to store the generated fifth data.

The target detector 54 determines whether the likelihood information of the sixth data supplied from the multiplication processor 52 falls below a predetermined error-alarm probability. If the likelihood information of the sixth data falls below the error-alarm probability, the target detector 54 determines that a target has been detected.

As described above, in the second embodiment, the likelihood calculator 51 calculates likelihood information based on the distribution of amplitude values indicated by first data. The likelihood calculator 51 converts the amplitude value indicated by the first data into calculated likelihood information to generate fourth data. The multiplication processor 52 multiplies likelihood information of the fourth data supplied from the likelihood calculator 51 with likelihood information of fifth data estimated based on the previous scan result to generate sixth data. The target detector 54 detects a target using likelihood information indicated by the generated sixth data. In the radar device according to the first embodiment, the integration processor 23 adds a power (or amplitude value) every scan, and the synthesis value linearly increases. Therefore, the dynamic range needs to be wide. In contrast, in the radar device according to the second embodiment, the multiplication processor 52 multiplies two likelihood information pieces, and the target detector 54 probabilistically detects a target using likelihood information obtained by the multiplication. Therefore, increase in the dynamic range can be prevented.

Accordingly, the radar device according to the second embodiment, can detect a target even when the RCS of the target is small.

In the second embodiment, the probability density distribution of receiver noise amplitudes is assumed to be a gaussian distribution. However, the radar device may assume various probability density distributions of noise amplitudes, and use the distributions for likelihood calculation.

[Other Embodiments]

In the above-described embodiments, a target present position at the time of the next scan is estimated regardless of the altitude of a target. However, the moving velocity of some targets is limited depending on the altitude. Therefore, the signal processor 224 may limit the absolute value of the velocity depending on the altitude, and determine the value of relative velocity $v_m$ within the limited scope of the velocity. This configuration can reduce the operation amount.

In the above-described embodiments, range data obtained in all radar areas is converted into first data. However, it is not always necessary to convert range data obtained in all radar areas into first data. For example, a short range where a target can be detected by a conventional radar operation may be excluded from the conversion area. In this case, in the first embodiment, the signal processor 224 outputs range data obtained in the short range to the target detector 26. The target detector 26 detects a target based on the amplitude value (or power value) of the range data. In the second embodiment, the signal processor 224 outputs range data obtained in the short range to the likelihood calculator 51. The likelihood calculator 51 compares the amplitude value (or power value) of the range data with the probability density distribution of receiver noise to calculate likelihood information. Then, the target detector 54 detects a target based on the likelihood information.

Relative velocity $v_m(m)=m \cdot \Delta f \cdot c/fc$ may cause folding depending on frequency $f_{PRF}$ of the radar device. The number D of folding is given by $$D = \left\lceil \frac{\frac{2v}{c}fc}{f_{PRF}} \right\rceil, \quad (6)$$

where v represents an actual velocity of a target searched for. To avoid incorrect relative velocity estimation caused by folding, the signal processor 224 may be configured to calculate relative velocity $v_m$ while regarding velocity vector v based on virtual dimensional expansion for compensation of folding. The folded dimensional velocity is given by $$\bar{v}=[d_1v_1, \ldots, d_1v_m, dv_1 d_2v_1, \ldots, d_2v_m, \ldots, Dv_1, \ldots, Dv_m], \quad (7)$$

where d represents the number of folding, and d corresponds to d1 to D.

In the above-described embodiments, a target is assumed to move in uniform linear motion. However, the movement model of a target is not limited to uniform linear motion.

In the above-described embodiment, the radar includes a transmitter and a receiver. However, the radar device need not always include both of the transmitter and the receiver. The transmitter and receiver may be separately provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A radar device, comprising:
   a transmitter configured to transmit a plurality of transmission pulses per direction to a search area;
   a radio module configured to receive per direction a plurality of received pulses corresponding to the transmission pulses;
   a pulse compressor configured to perform pulse compression on the received pulses to generate a range bin data item for each of the received pulses;
   a Doppler filter processor configured to perform coherent integration on a plurality of range bin data items generated for each direction to generate a range bin data item for each frequency bin;
   a signal processor configured to generate first data indicating a state of the search area using a range, an azimuth angle, an elevation angle, and a relative velocity calculated based on the frequency bin, based on the range bin data item for each frequency bin obtained by one scan to the search area;
   an integration processor configured to generate third data by integrating the first data generated at the signal processor with second data generated based on first data obtained by a previous scan to the search area;
   an estimation module configured to estimate a position at a time of a next scan based on a relative velocity indicated by the third data and shift the third data to the estimated position to generate second data; and
   a target detector configured to detect a target based on the third data.

2. The radar device of claim 1, wherein
   the signal processor determines the relative velocity within a velocity scope set in accordance with an altitude.

3. The radar device of claim 1, wherein
   the signal processor outputs range data obtained within a predetermined range to the target detector and generates the first data based on range data obtained outside the range; and
   the target detector detects a target based on a strength of the range data output from the signal processor.

4. The radar device of claim 1, wherein
   the signal processor calculates the relative velocity using a velocity dimensionally expanded to compensate for folding.

5. A radar device, comprising:
   a transmitter configured to transmit a plurality of transmission pulses per direction to a search area;
   a radio module configured to receive per direction a plurality of received pulses corresponding to the transmission pulses;
   a pulse compressor configured to perform pulse compression on the received pulses to generate a range bin data item for each of the received pulses;
   a Doppler filter processor configured to perform coherent integration on a plurality of range bin data items generated for each direction to generate a range bin data item for each frequency bin;
   a signal processor configured to generate first data indicating a state of the search area using a range, an azimuth angle, an elevation angle, and a relative velocity calculated based on the frequency bin, based on the range bin data item for each frequency bin obtained by one scan to the search area;
   a likelihood calculator configured to compare the first data with a noise occurrence probability density distribution to calculate likelihood information indicating a probability that the first data is derived from noise, and generate second data indicating the first data using the calculated likelihood information;
   a multiplication processor configured to multiply the second data generated at the likelihood calculator by third data generated based on second data obtained by a previous scan to the search area to generate fourth data;
   an estimation module configured to estimate a position at a time of a next scan based on a relative velocity indicated by the fourth data and shift the fourth data to the estimated position to generate third data; and
   a target detector configured to detect a target based on the fourth data.

6. The radar device of claim 5, wherein
   the signal processor determines the relative velocity within a velocity scope set in accordance with an altitude.

7. The radar device of claim 5, wherein
   the signal processor outputs range data obtained within a predetermined range to the likelihood calculator and generates the first data based on range data obtained outside the range;
   the likelihood calculator compares the range data with the noise occurrence probability density distribution to calculate likelihood information; and
   the target detector detects a target based on the likelihood information regarding the range data.

8. The radar device of claim 5, wherein
   the signal processor calculates the relative velocity using a velocity dimensionally expanded to compensate for folding.

9. A radar receiver, comprising:
   a radio module configured to receive per direction a plurality of received pulses from a search area;
   a pulse compressor configured to perform pulse compression on the received pulses to generate a range bin data item for each of the received pulses;
   a Doppler filter processor configured to perform coherent integration on a plurality of range bin data items generated for each direction to generate a range bin data item for each frequency bin;
   a signal processor configured to generate first data indicating a stale of the search area using a range, an azimuth angle, an elevation angle, and a relative velocity calculated based on the frequency bin, based on the range bin data item for each frequency bin obtained by one scan to the search area;
   an integration processor configured to generate third data by integrating the first data generated at the signal processor with second data generated based on first data obtained by a previous scan to the search area;
   an estimation module configured to estimate a position at a time of a next scan based on a relative velocity indicated by the third data and shift the third data to the estimated position to generate second data; and a target detector configured to detect a target based on the third data.

10. The radar receiver of claim 9, wherein
the signal processor determines the relative velocity within a velocity scope set in accordance with an altitude.

11. The radar receiver of claim 9, wherein
the signal processor outputs range data obtained within a predetermined range to the target detector and generates the first data based on range data obtained outside the range; and
the target detector detects a target based on a strength of the range data output from the signal processor.

12. The radar receiver of claim 9, wherein
the signal processor calculates the relative velocity using a velocity dimensionally expanded to compensate for folding.

13. A radar receiver, comprising:
a radio module configured to receive per direction a plurality of received pulses from a search area;
a pulse compressor configured to perform pulse compression on the received pulses to generate a range bin data item for each of the received pulses;
a Doppler filter processor configured to perform coherent integration on a plurality of range bin data items generated for each direction to generate a range bin data item for each frequency bin;
a signal processor configured to generate first data indicating a state of the search area using a range, an azimuth angle, an elevation angle, and a relative velocity calculated based on the frequency bin, based on the range bin data item for each frequency bin obtained by one scan to the search area;
a likelihood calculator configured to compare the first data with a noise occurrence probability density distribution to calculate likelihood information indicating a probability that the first data is derived from noise, and generate second data indicating the first data using the calculated likelihood information;
a multiplication processor configured to multiply the second data generated at the likelihood calculator by third data generated based on second data obtained by a previous scan to the search area to generate fourth data;
an estimation module configured to estimate a position at a time of a next scan based on a relative velocity indicated by the fourth data and shift the fourth data to the estimated position to generate third data; and
a target detector configured to detect a target based on the fourth data.

14. The radar receiver of claim 13, wherein
the signal processor determines the relative velocity within a velocity scope set in accordance with an altitude.

15. The radar receiver of claim 13, wherein
the signal processor outputs range data obtained within a predetermined range to the likelihood calculator and generates the first data based on range data obtained outside the range;
the likelihood calculator compares the range data with the noise occurrence probability density distribution to calculate likelihood information; and
the target detector detects a target based on the likelihood information regarding the range data.

16. The radar receiver of claim 13, wherein
the signal processor calculates the relative velocity using a velocity dimensionally expanded to compensate for folding.

17. A target detection method, comprising:
receiving per direction a plurality of received pulses from a search area;
performing pulse compression on the received pulses to generate a range bin data item for each of the received pulses;
performing coherent integration on a plurality of range bin data items generated for each direction to generate a range bin data item for each frequency bin;
generating first data indicating a state of the search area using a range, an azimuth angle, an elevation angle, and a relative velocity calculated based on the frequency bin, based on the range bin data item for each frequency bin obtained by one scan to the search area;
generating third data by integrating the generated first data with second data generated based on first data obtained by a previous scan to the search area;
estimating a position at a time of a next scan based on a relative velocity indicated by the third data and shifting the third data to the estimated position to generate second data; and
detecting a target based on the third data.

18. A target detection method, comprising:
receiving per direction a plurality of received pulses from a search area;
performing pulse compression on the received pulses to generate a range bin data item for each of the received pulses;
performing coherent integration on a plurality of range bin data items generated for each direction to generate a range bin data item for each frequency bin;
generating first data indicating a state of the search area using a range, an azimuth angle, an elevation angle, and a relative velocity calculated based on the frequency bin, based on the range bin data item for each frequency bin obtained by one scan to the search area;
comparing the first data with a noise occurrence probability density distribution to calculate likelihood information indicating a probability that the first data is derived from noise, and generating second data indicating the first data using the calculated likelihood information;
multiplying the generated second data by third data generated based on second data obtained by a previous scan to the search area to generate fourth data;
estimating a position at a time of a next scan based on a relative velocity indicated by the fourth data and shifting the fourth data to the estimated position to generate third data; and
detecting a target based on the fourth data.

* * * * *